United States Patent
Patel

(10) Patent No.: US 9,712,468 B2
(45) Date of Patent: Jul. 18, 2017

(54) NETWORK-ENABLED METHOD FOR FAMILY MEMBERS WITH SHARED INTERESTS OR FUTURES TO MUTUALLY ASSIST ONE ANOTHER

(71) Applicant: Jaimini Indravadan Patel, Union City, CA (US)

(72) Inventor: Jaimini Indravadan Patel, Union City, CA (US)

(*) Notice: Subject to any disclaimer, the term of this patent is extended or adjusted under 35 U.S.C. 154(b) by 0 days.

(21) Appl. No.: 15/453,460

(22) Filed: Mar. 8, 2017

(65) Prior Publication Data

US 2017/0180287 A1    Jun. 22, 2017

Related U.S. Application Data

(60) Provisional application No. 62/403,592, filed on Oct. 3, 2016.

(51) Int. Cl.

| | |
|---|---|
| *H04M 11/04* | (2006.01) |
| *H04L 12/58* | (2006.01) |
| *H04L 29/08* | (2006.01) |
| *H04L 12/46* | (2006.01) |
| *H04W 4/22* | (2009.01) |
| *G01S 19/17* | (2010.01) |
| *H04W 4/04* | (2009.01) |

(52) U.S. Cl.
CPC ............ *H04L 51/08* (2013.01); *G01S 19/17* (2013.01); *H04L 12/4641* (2013.01); *H04L 67/10* (2013.01); *H04L 67/306* (2013.01); *H04W 4/046* (2013.01); *H04W 4/22* (2013.01)

(58) Field of Classification Search
CPC .......... G01S 19/17; H04W 4/064; H04W 4/22
USPC ............. 455/404.2, 404.1; 370/259; 709/204
See application file for complete search history.

(56) References Cited

U.S. PATENT DOCUMENTS

| | | | |
|---|---|---|---|
| 8,538,374 B1* | 9/2013 | Haimo | G01S 19/17 370/259 |
| 2013/0295872 A1* | 11/2013 | Guday | H04W 4/046 455/404.1 |

* cited by examiner

*Primary Examiner* — Kyung H Shin
(74) *Attorney, Agent, or Firm* — Richard B. Main; Main Law Cafe

(57) ABSTRACT

A social networking device and method that creates a new virtual private network and interface for family members that have shared interests in each other's health, finances, travel, calendars, special events, debts, and physical access to assets. Fundamental to these interests are their individual respective commitments to help one another, and need for automation to assist them with the means needed to be made aware and the tools needed to be effective. A generic family-hub mobile app is downloaded to corresponding mobile devices and independently used by each family member to invite others to join a new family-hub VPN, enroll, share personal information, and access graphical user interfaces (GUI). Several dashboards in the GUI are included with scoreboards for the health, finances, travel, calendars, special events, debts, and physical access to assets of the other enrolled family members.

5 Claims, 3 Drawing Sheets

NETWORK-ENABLED METHOD FOR FAMILY MEMBERS WITH SHARED INTERESTS OR FUTURES TO MUTUALLY ASSIST ONE ANOTHER

FIELD OF INVENTION

The present invention relates to a network-enabled method for a group of people with shared interests or futures to mutually assist one another. And more specifically to expanded capabilities of mutual assistance that use mobile network technologies to increase the quality and speed that relevant personal information can be accessed and acted upon to for the benefit of the group.

BACKGROUND OF THE INVENTION

Family members have shared interests in each others health, finances, travel, calendars, special events, debts, and physical access to assets. Fundamental to these interests are their individual commitments to help one another, and need for automation to assist them with the means to be made aware and the tools to be effective.

Families with adult children very often share a home and agree to split the monthly expenses of maintaining the household. The splits between family members commonly follow the ability of each to provide the needed support. For example, a traditional nuclear family consisting of a father, mother, son, and daughter has agreed to share the expenses of their home. The father is fully employed in a good salary job and agrees to pay the largest expenses of home mortgage installments, property taxes, and electrical utility. The mother has a part-time job and agrees to pay the installment loans on their cars. The daughter is also employed, already graduated university, and she agrees to pay the other utilities and Internet WiFi access. The son is not employed and a full time student at high school, and agrees to placing the garbage collection bins, landscaping, house-cleaning, and pet care.

Whether or not a family shares a single home, family members often involve themselves in each other's health watch, and assistance. Individual family members can have special health concerns like diabetes, Alzheimer's, Parkinson's, allergies, vaccinations, handicaps, etc. These necessitate that the other family members have immediate access to what the conditions are and what to do in the event of an emergency. For example, suppose a father-husband is routinely hospitalized for a planned chemotherapy session and all of sudden an emergency develops during the session. In this situation, the mother-wife can quickly click an emergency notification message to update all the family members about the particulars of the emergency. Such saves the information source time and attention they cannot waste making multiple calls to say the same things, and it also relieves them from the stresses of responding questions that probably have no immediate answers. Everyone can get the hospital's address because it was already recorded in the mobile app without wasting much of the critical time.

Family members often need to involve themselves in each others travel plans, e.g., to set up group travel. Some members can have special needs or desires connected to travel. For example, a family member confined to a wheelchair would need to make special bookings for airfares, hotels, etc. Other family members with intense interests in archeology would benefit from travel arrangements that flagged or accommodated visits to nearby museums, excavations, and similar activities.

Family members can also need to share passwords and key codes, some of which may never be needed or used only for an emergency. For example, a family member away from home may need another family member to get into their home or business. More particularly, that other family member may need to get into the home or business when the first family member is altogether unavailable or missing, and such as passwords of lockers and shared bank accounts. Family members also need to share documents between them like Grandpa's Will, a spouse's tax return, financial statements, etc.

What is needed is a social networking method and device in which each family member can input the information they have to share, and query the shared information they need to be a good family member.

SUMMARY OF THE INVENTION

A social networking device for use by a family member comprises a FamilyHub™ mobile app installable on a personal mobile device capable of wireless communication with a centralized cloud network server. The centralized cloud network server is managed by a FamilyHub administrator and will initiate a new virtual private network (VPN) for the exclusive use of each new family that joins in. The FamilyHub mobile app includes and manages an interactive graphical user interface (GUI) that every enrolled family member with a mobile device can input the information they have to share, and query the shared information about the others they need to be a good, supportive and responsible family member. Each FamilyHub VPN employs the centralized cloud network server to securely store and maintain the family members' personal data.

An alternative method embodiment of the present invention includes a social networking amongst family members that enable them to cooperate in the care and management of each other's finances, debts, assets, health, calendar, travel, password assesses, etc. Each family member uses their own wireless mobile device in communication with a private server, e.g., as implemented with Apple iOS, Android, and Amazon Web Services.

These and other objects and advantages of the present invention no doubt become obvious to those of ordinary skill in the art after having read the following detailed description of the preferred embodiments which are illustrated in the various drawing figures.

DETAILED DESCRIPTION OF THE EMBODIMENTS

Figure 1:
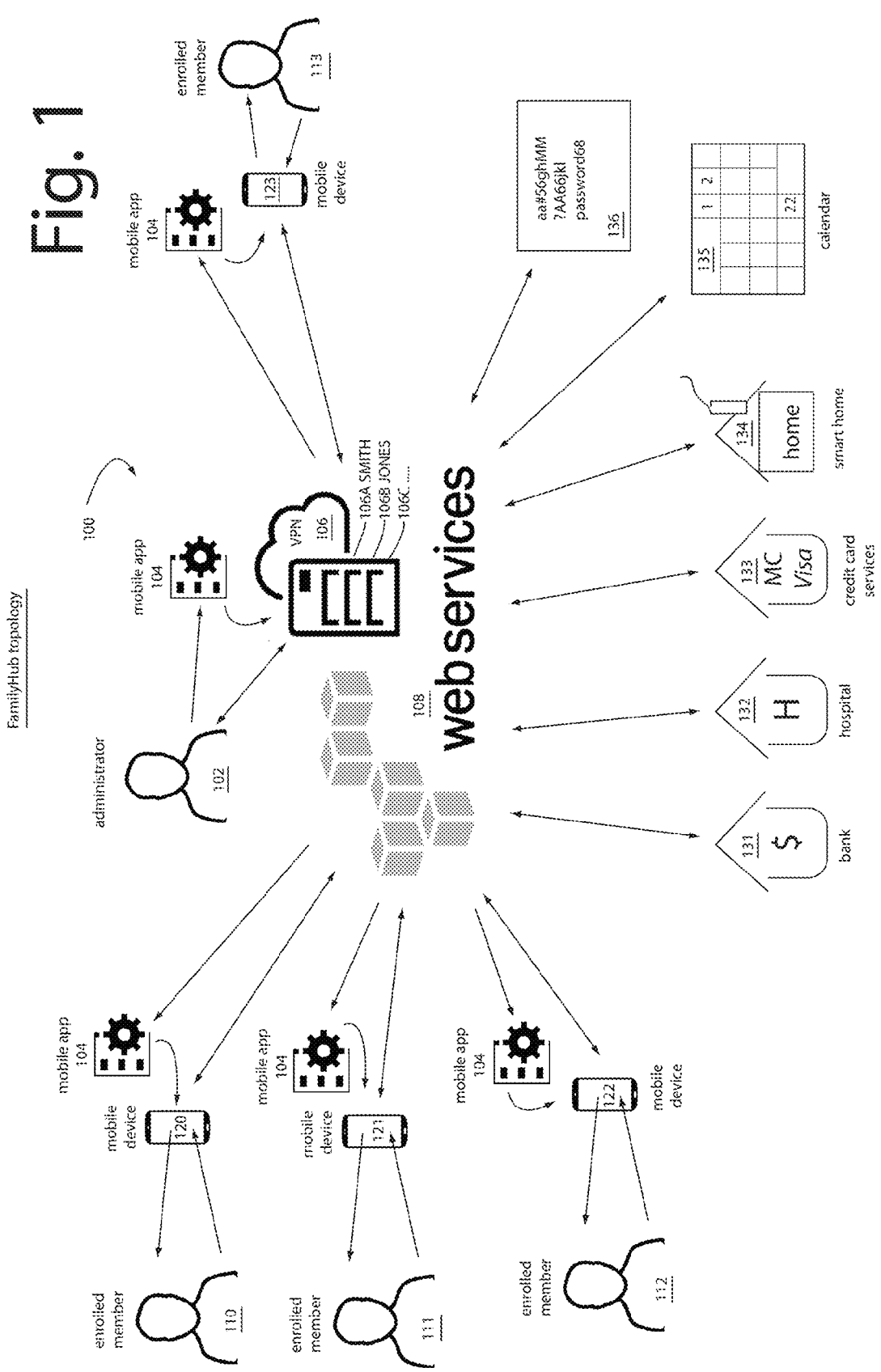
FIG. 1 is a block diagram of a social networking topology embodiment of the present invention with a plurality of independent and unrelated family-hub virtual private networks (VPNs) hosted by a web service provider that each support and secure a group of enrolled family members with family-hub mobile apps on generic mobile devices.

FIG. 1 illustrates a social networking topology of an embodiment of the present invention and is referred to herein by the general reference numeral 100. An administrator 102 manages a standard control model for a family-hub mobile app 104 and a model family-hub virtual private network (VPN) 106 hosted in the Internet Cloud by a web services network server 108. For example, Amazon Web Services. A variable number of VPNs 106A, 106B, 106C, etc., are automatically duplicated and reserved to a corresponding variable number of families by the web services network server 108. A copy of family-hub mobile app 104 downloaded to a mobile device is used to trigger such VPN creation by an initiating family member. Each new VPN 106A, 106B, 106C, etc., is restricted in its access and control to a corresponding single respective family as a sub-administrator.

For example in FIG. 1, a father 110, a mother 111, a daughter 112, and a son 113 represent a single nuclear family with shared interests. The father 110 initiates a new VPN 106 for the family's exclusive use by downloading a copy of family-hub mobile app 104 to his mobile device 120. He begins by naming the new family hub, e.g., SMITH, JONES, etc., and making a list of the names and contact information of the other family members 111-113 in invite. See FIG. 2. Each new VPN 106 automatically sends out invitations to the corresponding invited family members to download the mobile app 104 and to exclusively enroll in new VPN 106.

Each enrolled family member 110-113 can be included and enrolled in other unrelated and independent family-hub VPNs 106.

In such cases, their respective single mobile apps 104 will multiplex amongst the involved family hub VPNs, and very importantly, do it without any uncontrolled or unintended personal data leakage between. The involved family-hub VPNs 106 are all configured by administrator 102 to enforce such firewalls. Family members 110-113 enrolled in multiple family hub VPNs 106 can economize in the chore of entering their own personal data by authorizing the first family-hub VPN 106 they've enrolled into to form-populate data into any subsequently enrolled ones.

By way of further example, enrolled family members 110-113 share a home together and its expenses. As is normal, the enrolled family members 110-113 each share interests for the other enrolled family members' health, travel, news, business and personal calendars, and security.

Web services 108 can be physically implemented in a number of different ways. For example, Amazon Web Services (AWS) can provide a variable number of instances of a generic VPN 106 on the Internet and a secure database for each, all for a monthly subscription or use charge to an operator with an administrator. The character and personality expressed through the AWS by the generic web presence on the Internet and a secure database are installed, modified, and controlled by an administrator. The basic ways these are accomplished are conventional. We will describe here the novel details that provide the particular family-hub VPN 106 we require.

One more visible aspect of family-hub mobile app 104 is its interactive graphical user interface (GUI) through which each enrolled family member 110-113 can initially enroll, set preferences, log personal information about themselves, issue notifications, receive notifications, query, and do research. See FIG. 2. The first to enroll triggers a new instance of a family-hub VPN 106 that begins as a blank slate. The new family-hub VPN 106 is given a name, e.g., SMITH FAMILY HUB, and its own Internet Protocol address and Uniform Resource Locator (URL). A first level of privacy is afforded by not making the IP-Address or its URL public. The first-to-enroll family member 110-113 creates an invitations list for other selected family members 110-113 to receive an invitation to join and a link to download mobile app 104.

Many people today are already comfortable going online to check their bank balances and to pay bills. Payments received, payments due, payment histories, account statements, and similar ilk are now all routinely accessible by individuals online with their banks, credit card companies, lenders, etc. Credit card companies now routinely send on emails and SMS text messages reminding their customers that a payment is due or a charge has occurred.

FIG. 1 represents such external databases as a bank 131, a hospital 132, a credit card service 133, a smart home 134, a family calendar 135, and a password vault 136. Others are possible of course. Each new VPN 106 is provided the appropriate USER-IDs and passwords for each so that updates within VPN 106 can automatically occur and be exclusively forwarded to the various dashboards and scoreboards displayed on mobile devices 120-123.

Once each family-hub mobile app 104 is installed and enrolled for a particular family member 110-113, it is then enabled to receive user-ID and password information. It securely passes these to the corresponding particular family-hub VPN 106. That then allows the particular family-hub VPN 106 to directly access the accounts of the family member over the Internet and to then automatically stay abreast of the account health.

Several categories of family interaction are implemented, e.g., health, travel, calendar, events, password vault sharing, finances, etc. Each is represented by a page each enrolled family member 110-113 can navigate to with their family-hub mobile app 104 on their respective personal mobile devices.

A social networking method embodiment of the present invention is limited to a family. The method begins with the initiating of a new virtual private network (VPN), with its access limited to designated family members, from a family-hub mobile app installed on a first mobile device. Then designating from the family-hub mobile app installed on the first mobile device a list of family members by their names and corresponding electronic contact information. And electronically inviting each one of the list of family members to join the new VPN 106 using the electronic contact information and names by downloading the family-hub mobile app. Then enrolling each invited family member invited to join the new VPN 106 if each employs the family-hub mobile app from their own respective mobile devices. And accepting personal information prompted from each enrolled family member through their respective family-hub mobile apps from their respective mobile devices and storing it with a secure web service on the Internet. And displaying selected bits of the personal information provided by one enrolled family member to another enrolled family member in the same new VPN 106 via a suite of dashboards implemented with a graphical user interface (GUI) in the family-hub mobile app. Wherein, any individual with the family-hub mobile app installed on any other mobile device is allowed to be an enrolled family member in more than one VPN 106 and in more than one family-hub.

It is important that private personal information from one VPN 106 not leak into or be accessible by any other VPN 106, but that, in fact, is the basic nature of any VPN. However, it would be advantageous to each user who enrolls in more than one VPN 106 to be able to paste their own personal information into all the VPN 106's in which they enroll.

Figure 2:
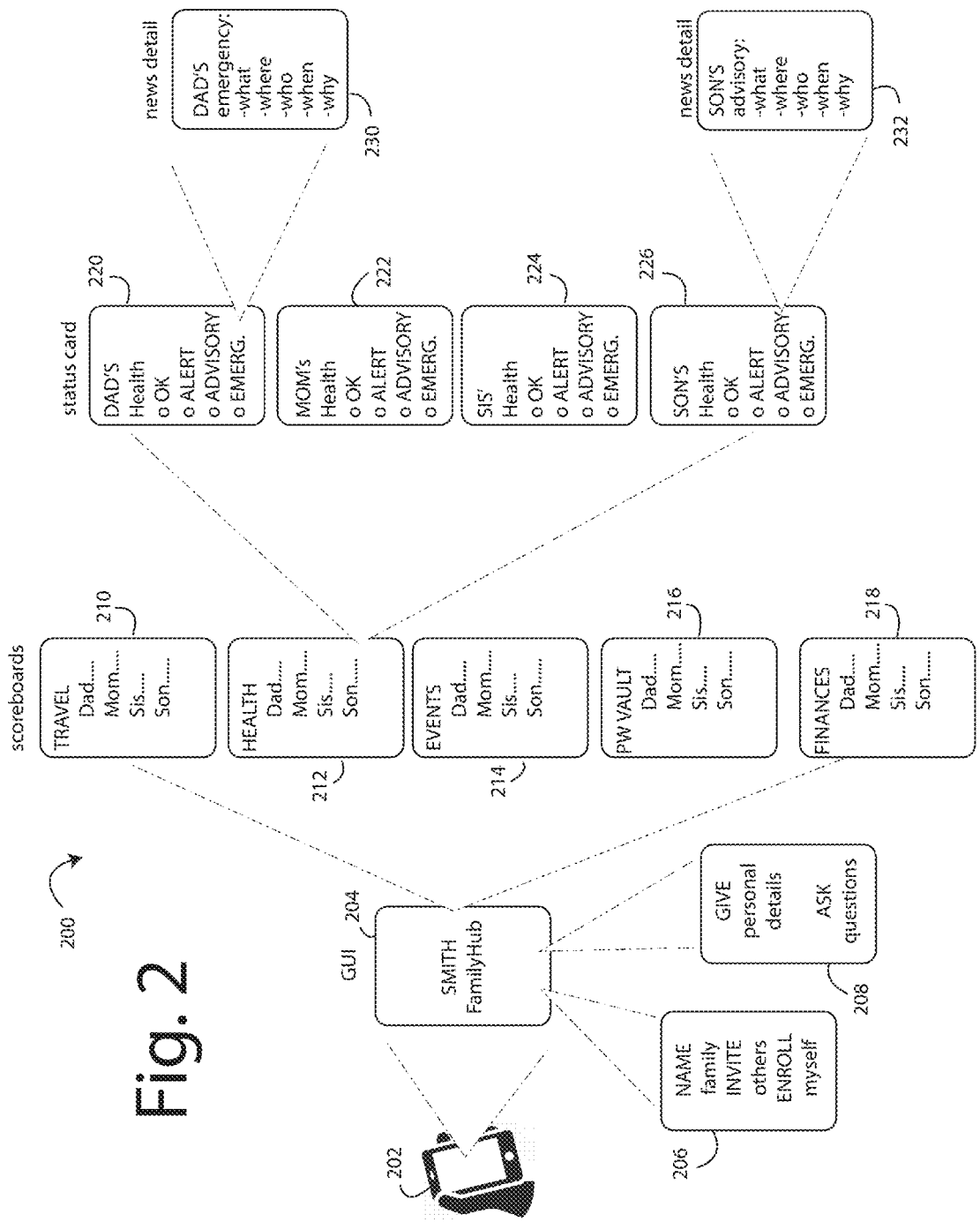
FIG. 2 is an exploded view diagram showing a family-hub member's mobile device with a graphical user interface (GUI) that can be touch navigated to a number of family member scoreboards, status cards, and news details.

FIG. 2 illustrates a family-hub member's mobile device 202 with a graphical user interface (GUI) 204 that can be touch navigated to an initiation screen 206, a personal details database screen 208, a number of family member scoreboards 210-218, a corresponding set of status cards 220-226, and a few exemplary news details screens 230, 232. All such visual screens and interfaces are touch-interactive with the user, rendered, produced, and made navigable by a family-hub mobile app 104 (FIG. 1) installed on mobile device 202.

A health dashboard such as 212 uses GUI 204 to display a scoreboard listing all the enrolled family members 110-113 and their respective color-coded health status. E.g., green for all-is-well, yellow for alert, and red for emergency.

A finance dashboard such as 218 uses GUI 204 to display a scoreboard listing all household bills the enrolled family members 110-113 have agreed to share amongst them and their respective payment status. E.g., days until due, amount due, who is responsible, payment history, etc.

A travel dashboard such as 210 uses GUI 204 to display a scoreboard listing of the current locations of all the enrolled family members 110-113, e.g., at-home, on-travel, at-destination. Then a simple way to drill-down is provided to get by-the-moment contact information, itinerary, host, agenda, special needs.

A password vault such as 216 secures the user and password information each of the enrolled family members 110-113 cares to share with others that will allow them to come to their assistance in unforeseen situations.

Any family member can be a part of more than one family group. Such is similar to one member in a group can be part of other groups as well. So in that case, if one wanted to share details of their health with their spouse, and not their mother, then they can equally be a part of two different family hubs or family groups.

Embodiments of the present invention can be implemented with the following tools and techniques:
1. Mockups: Invision, marvel, Flinto, Swift Balsamiq are useful to build wireframes and storyboards.
2. BackEnd: The wireframes help draw the four major parts of an application:
   a. Servers
   b. Data model
   c. API's
   d. Storage Solutions
For this, the following technologies are useful:
   1. Code storage and versioning: Github
   2. Servers and Data Model: AWS
   3. API's: Java—Android
   Builds for the Android Architecture:
   Android provides multi-user Linux system which means a different mobile app equals different user. Each mobile app will have its on ID, Virtual Machine, etc.
   Data sharing between mobile apps: Allowing to mobile apps to share the same Linux user Id we will allow multiple family member to have the same version of data and mobile app.
   The core architecture of Android provides: Activities, Content Provider, Services, Broadcast Receivers, Intent, manifest.xml and are used to build the mobile app.
   Database Schema: SQL using the internal store.
4) Test the application:
   A software called Framer is used to test each application.
5) Caching and Scaling.

A first embodiment of the present invention is reduced to practice with Amazon Web Services (AWS). AWS provides a range of services to help developers build mobile apps that can scale to hundreds of millions of users, and reach global audiences. AWS enables developers to get started quickly, to ensure high quality by testing on real devices in the cloud, and then measure and improve user engagement. Developers can include logic, storage, databases, monitoring, streaming, content delivery, data warehousing, and machine learning in their mobile app without having to manage any infrastructure. AWS makes adding cloud services to mobile apps very easy, e.g., to create a serverless mobile backend, to manage user identity and sign-in, to send push notifications, to track usage patterns and to optimize their mobile apps with in-mobile app analytics. Tests can be run against a large collection of real devices.

A micro-services framework based on a modified MEAN Stack (MongoDb DynamoDb, Express.js, Angular.js, Node.js). This runs on an Elastic Beanstalk using the Node.js template. Auto Scaling Groups are used with Elastic Load Balancers. This allow low cost operations to begin with, and yet can be scaled up to a large workload with practically no rework.

DynamoDb was determined to be a good fit to our purposes here. While AWS has relational database services available, our mobile app is a social mobile app, and generally would not require ACID transactions. Eventual consistency should fit our needs. While AWS doesn't provide specific SLAs on their eventual consistency model, most writes would complete in under ¼ second, and very rarely would any go over one second. With social mobile apps it is generally acceptable if the content someone writes is not available until a fraction of a second later. DynamoDb is inexpensive and reliable, and has a small operational overhead compared to a relational database. It could be that further down the road a relational database will be needed, e.g., AWS Aurora.

Current plans are to start in only one AWS Region, either US-EAST or US-WEST, and that should be able to achieve 99.5% uptime. A higher availability target can be realized by adding additional regions, but with this comes a significant cost and complexity in syncing data across regions.

With Xamarin, Appcelerator, and PhoneGap, and it was found that the negatives outweighed the positives. Maintaining separate code bases is of course another option to consider, but was ruled out. An Angular 2 NativeScript framework can produce iOS, Android, and web mobile apps from a single codebase.

Figure 3:
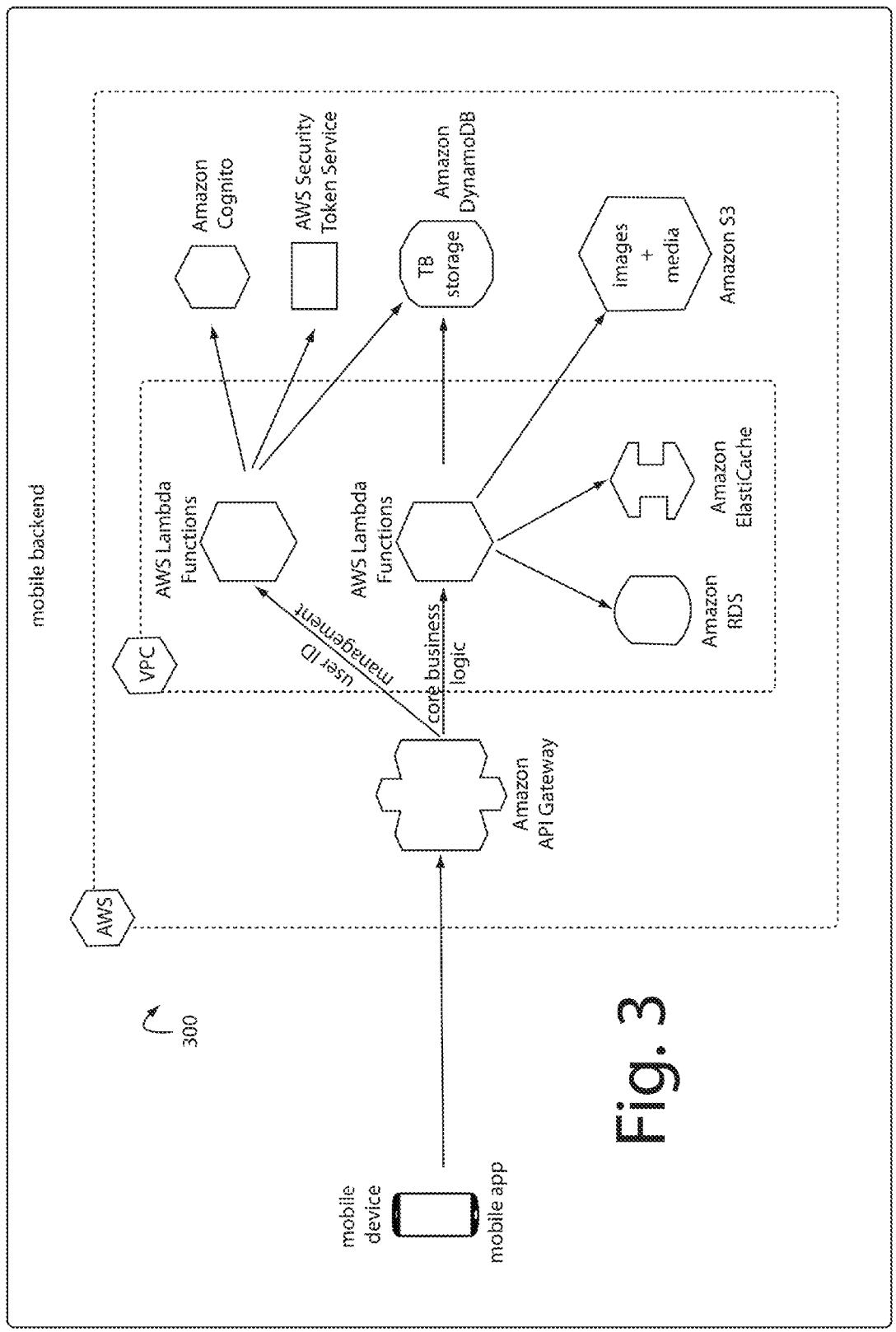
FIG. 3 is a block diagram of a cloud architecture that is fairly simple and follows a preferred reference architecture.

FIG. 3 represents a cloud architecture 300 that is fairly simple and follows a preferred reference architecture. Cognito securely signs in users with credentials it stores. User login securely invokes API's using AWS IAM. API Gateway mobile app makes REST API call to endpoint. Lambda runs logic shared across mobile apps. DynamoDB to query terabytes of data with millisecond latency.

Amazon API Gateway is a fully managed service that makes it easy for developers to create, publish, maintain, monitor, and secure APIs at any scale. API's can be created with a few clicks in the AWS Management Console to access data, business logic, or functionality from the back-end services, such as workloads running on Amazon Elastic Compute Cloud (Amazon EC2), code running on AWS Lambda, or any Web application. Amazon API Gateway handles all the tasks involved in accepting and processing up to hundreds of thousands of concurrent API calls, including traffic management, authorization and access control, monitoring, and API version management. Amazon API Gateway has no minimum fees or startup costs. Users pay only for the API calls they receive and the amount of data transferred out.

AWS Lambda lets users run code without provisioning or managing servers. Users pay only for the compute time they consume, there is no charge when their code is not running. With Lambda, users can run code for virtually any type of application or backend service, all with zero administration. Just uploading the code lets Lambda take care of everything required to run and scale the code with high availability. Users can set up their code to automatically trigger from other AWS services, or call it directly from any web or mobile app.

Amazon Simple Storage Service (Amazon S3) is an object storage with a simple web service interface to store and retrieve virtually any amount of data from anywhere on the web. It is designed to deliver 99.999999999% durability, and scale past trillions of objects worldwide. Amazon S3 is best used as a primary storage for cloud-native applications, e.g., as a bulk repository, or "data lake," for analytics, as a target for backup & recovery and disaster recovery, and in serverless computing. It's simple to move large volumes of data into or out of Amazon S3 with Amazon's cloud data migration options. Once data is stored in S3, it can be automatically tiered into lower cost, longer-term cloud storage classes like S3 Standard Infrequent Access and Amazon Glacier for archiving.

A network-enabled method for a group of people with shared interests and/or futures to mutually assist one another begins by inviting via a mobile device a number of particular persons each with their own respective mobile devices to enroll in a mutual-assistance group. Then, soliciting each of the number of particular persons each with their own respective mobile devices from a network server to independently provide a minimum of initial and on-going health, travel, and financial personal details about themselves as a condition of enrollment. This then permits collecting and organizing the initial and on-going health, travel, and financial personal details about each of the particular persons into a database that then enables selected information to be accessed, understood, and acted upon by at least one other of the number of particular persons that are then enrolled. On query, by any enrolled one of the number of particular persons, the next step includes accessing relevant bits of the initial and on-going health, travel, and financial personal details about each of the particular persons, and then displaying such on one of the respective mobile devices to inform a corresponding person. The object and advantage of this is a group of people with shared interests and/or futures are empowered to mutually assist one another beyond what is possible without mobile device technologies and networks.

Although the focus and words used here are directed to families and cooperating family members, the technologies described herein are no less useful and advantageous to any group of people who want to be involved with and actively assist one another, financially, emotionally, physically, etc. The rosters of who gets invited to each family-hub VPN is entirely under the control of the first initiating member. Each enrolled member can further place different limits on what the other enrolled members can view or access, e.g., the Dad would be granted more access and authority than the teenage son.

The invention claimed is:

1. A network-enabled method for family members with shared interests and/or futures to mutually assist one another, comprising:
    inviting via a mobile device a number of particular persons each with their own respective mobile devices to enroll in a mutual-assistance group;
    soliciting each of the number of particular persons each with their own respective mobile devices from a network server to independently provide a minimum of initial and on-going health, travel, and financial personal details about themselves as a condition of enrollment;
    collecting and organizing the initial and on-going health, travel, and financial personal details about each of the particular persons into a database that then enables selected information to be accessed, understood, and acted upon by at least one other of the number of particular persons that are then enrolled; and
    on query by any enrolled one of the number of particular persons, accessing relevant bits of the initial and on-going health, travel, and financial personal details about each of the particular persons, and then displaying such on one of the respective mobile devices to inform a corresponding person;
    wherein, a group of people with shared interests and/or futures are empowered by the information they accessed to mutually assist one another beyond what is possible without mobile device technologies and networks.

2. The network-enabled method of claim 1, comprising:
    touch-navigating a family-hub member's mobile device with a graphical user interface (GUI) through to a number of family member scoreboards, status cards, and news details;
    wherein, family members with shared interests and/or futures are enabled by the information they share via their respective mobile devices to mutually assist one another.

3. A method of social networking limited to a family with shared interests, comprising:
    initiating a new family-hub virtual private network (VPN), and thereafter limiting its subsequent access to pre-designated family members, wherein any such initiating must be initiated from a family-hub mobile app installed on a first mobile device;
    designating from the family-hub mobile app installed on the first mobile device a list of family members by their names and corresponding electronic contact information which in operation limits the permissible membership of the new VPN;
    inviting electronically and automatically with an email or SMS message each one of the list of family members to join the new family-hub VPN using the electronic contact information and names, and then including with any such message a link for downloading the family-hub mobile app to any other mobile device;
    enrolling each invited family member invited to join the new family-hub VPN, requiring each to independently employ the family-hub mobile app to do so from their own respective mobile devices;
    accepting free-format personal information as prompted from each enrolled family member through their respective family-hub mobile apps and mobile devices, and reformatting the personal information into a standard format, and then storing such with a secure web service on the Internet accessible only to the new family-hub VPN; and
    displaying selected bits of the personal information provided by one enrolled family member to another enrolled family member in the same new family-hub VPN via a suite of dashboards implemented with a graphical user interface (GUI) included in the family-hub mobile app;

wherein, any individual with the family-hub mobile app installed on any mobile device is allowed to be an enrolled family member in more than one family-hub VPN.

4. The method of claim 3, wherein:

the initiating of each new family-hub VPN includes attaching a family name that visually identifies an active family-hub VPN to each designated family member via their respective family-hub mobile apps.

5. The method of claim 3, wherein:

the displaying is such that the suite of dashboards includes dashboards that use scoreboards to visually communicate between enrolled family members their respective health, travel, finances, and password vaults, and also birthdays, anniversaries, departures, arrivals, deadlines, due dates, and other special calendar dates.

* * * * *